Figure 5:
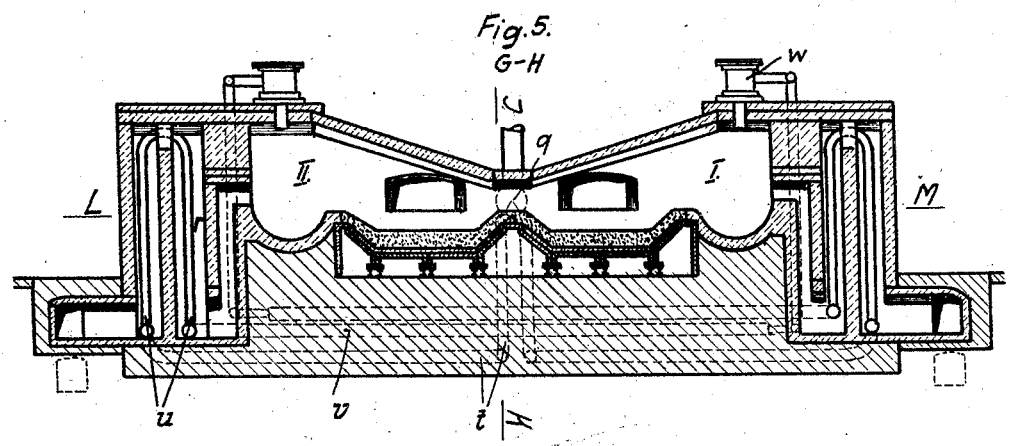

Feb. 9, 1926.
E. VOGT ET AL
1,572,336
SMELTING OR HEATING FURNACE WITH FIRING OF COAL DUST
Filed March 26, 1925     2 Sheets-Sheet 1
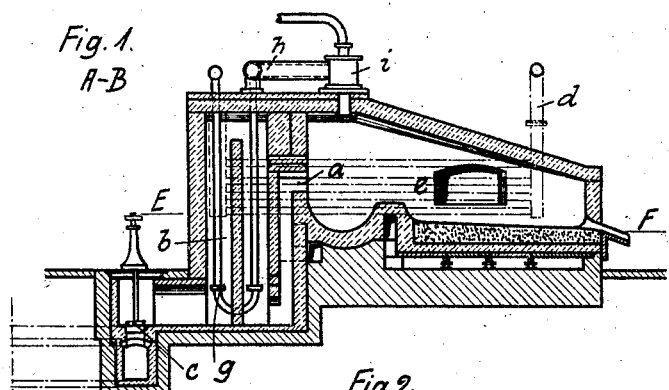
Fig. 1. A-B
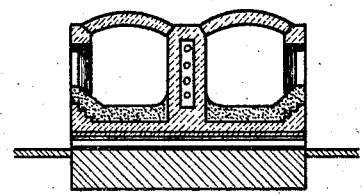
Fig. 2. C-D
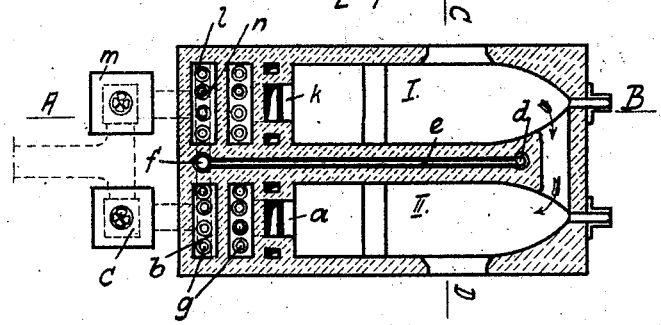
Fig. 3. E-F
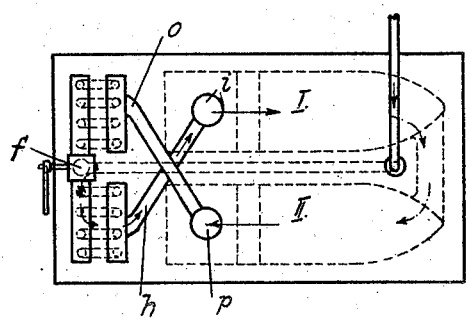
Fig. 4.

Patented Feb. 9, 1926.

1,572,336

UNITED STATES PATENT OFFICE.

ERICH VOGT AND LUDWIG KIRCHHOF, OF BERGISCH-GLADBACH, GERMANY.

SMELTING OR HEATING FURNACE WITH FIRING OF COAL DUST.

Application filed March 26, 1925. Serial No. 18,566.

*To all whom it may concern:*

Be it known that we, ERICH VOGT and LUDWIG KIRCHHOF, citizens of the German Republic, residing at Bergisch-Gladbach, Germany, have invented certain new and useful Improvements in or Relating to a Smelting or Heating Furnace with Firing of Coal Dust, of which the following is a specification.

In melting furnaces or other heating furnaces or stoves which are operated reversibly, it has hitherto been usual to draw off the exhaust gases through regenerative chambers. To keep the temperature in the chamber and the air temperature always practically constant, frequent reversal was necessary (generally every half hour). In furnaces or stoves fired with coal dust, the preheating of the secondary air to such a high temperature as was hitherto requisite with the air introduced into gas fired regenerative furnaces is no longer necessary, owing to the high temperature of combustion. In furnaces fired with coal dust, therefore, the high temperature of the exhaust gases may be used for preheating the material to be melted or heated, two hearths being provided, which serve alternately as the main hearth and the preheating hearth, the hot gases being alternately sent in opposite directions through the two hearth spaces. Since in this process reversal can only be effected when the material to be melted is completely melted on one of the hearths (or the material to be heated brought to a sufficiently high temperature), which under certain conditions may take six to eight hours, the use of the generative principle for preheating the secondary air is quite impossible, for the reason that the temperature of the secondary air in the last stage of the process, in which a high air temperature is necessary, would still be only slightly raised, even if it were raised at all. The provisions however of a common regenerator for the two hearth spaces, which are worked alternately, is difficult to effect, because in this case the heated air and the exhaust gases at a high temperature must always be passed from one combustion chamber to the other or from one hearth to the other. Such a system is scarcely practical owing to the burning and distortion of the reversing member caused by the high temperature. Regenerators are only found therefore, in furnaces working with a constant flame direction. In order to overcome these difficulties, according to this invention, the regenerator arrangement is so combined with the hearth spaces side by side or in tandem, that the alternate reversal of air and exhaust gases takes place in a cold condition.

In the drawings two constructional examples are illustrated, of which the first has two hearth spaces arranged side by side and the second has two hearth spaces in tandem.

Figure 6:
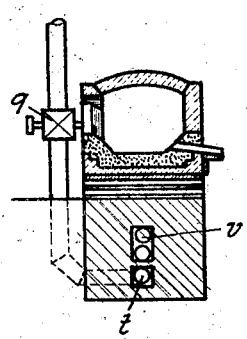
Figure 7:
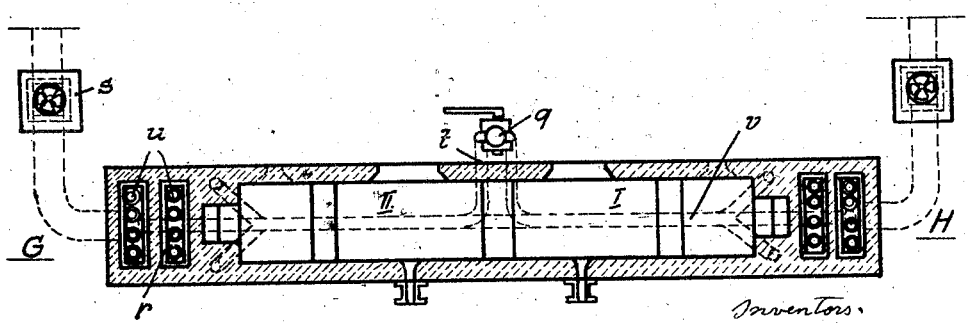

The first construction is shown in Figs. 1 to 4, of which Figs. 1 to 3 show sections and Fig. 4 a plan view. Figure 5 is a vertical longitudinal section. Figure 6 is a vertical cross section. Figure 7 is a horizontal section. The reversible regenerators are arranged in the extension of the hearth in front of the combustion chambers. The apparatus is best described by references to its method of operation.

When the hearth I is acting as the main hearth with its combustion chamber working, the exhaust gases are drawn through the hearth II and its combustion chamber, and through the flue $a$ in the generator $b$. After the exhaust gases have given up their heat to the tubes $g$ traversed by the secondary air by moving up and down in this regenerator, they are led away to the chimney through the valve $c$. The secondary air to be preheated is led through the main pipe $d$ and the tubular conduit $e$ which serves to cool the dividing wall of the hearths, to the three way valve $f$ and is supplied by the latter to the desired tube system $g$ in the regenerator $f$. After the air has been sufficiently preheated in the tube system $g$, it passes through the insulated main conduit $h$ to the coal dust burner $i$ of the hearth I. After the desired main process is finished in the hearth I, the preheated hearth II is set in operation as the main hearth, the flames and air then following the reverse path. In this case the exhaust gases from the hearth II pass through the hearth I for preheating the fresh material therein and from there through its combustion chamber and the flue $k$ to the regenerator $l$. From there the exhaust gases pass to the chimney through the exhaust valve $s$. The secondary air traverses the same path as that described above until it reaches the three-way valve $f$. By turning this valve the air to be heated passes through the tube system $n$, and through the similarly insulated collector conduit *o* to the burner *p* of the combustion chamber of the hearth II.

Besides the advantage of controlling the secondary air and the exhaust gases in a cold state, there is the further advantage that the regenerator is accessible and may be cleaned independently.

There is also the advantage that the temperature of the air is always higher at the end of the charge owing to the passage therethrough of exhaust gases of continually increasing temperature. This is of great importance owing to the desirability of high temperature at the end of melting or other processes.

The second construction with two hearths in tandem one behind the other is shown in Figures 5, 6 and 7 in the sections as indicated.

The secondary air here also passes to a three-way valve *q*. If in this case the hearth I is to be fired, the exhaust gases for the purposes of preheating pass through the hearth II arranged behind it and through its combustion chamber to the regenerator *r* and from there through the exhaust gas valve *s* to the chimney. With the three-way valve *q* in the corresponding position, the air passes through the conduit *t* into the tube system *u* of the regenerator *r*. To prevent the preheated air being cooled by its transference to the combustion chamber of the hearth I, it is led to the burner *w* of the said combustion chamber through the conduit *v*, which is situated in an insulated channel in the base of the furnace and in ascending to the burner divides into two branches in the dividing wall between the combustion chamber and regenerator. The reversal is effected in substantially the same way as has been described above for side by side hearth.

We claim:—

A smelting or heating furnace embodying two furnaces contiguously disposed and constructed to serve alternately as the main hearth and the preheating hearth with means for conducting the hot gases alternately in opposite directions, each oven having a dust-combustion chamber and a recuperator for the preliminary heating of the secondary air and the heating gases ot the one oven acting for preliminary heating air through the recuperator of said oven.

In testimony whereof we hereunto affix our signatures.

ERICH VOGT.
LUDWIG KIRCHHOF.